United States Patent
Roberts (10) Patent No.: US 10,343,664 B2
(45) Date of Patent: Jul. 9, 2019

(54) SYSTEM AND METHOD FOR DYNAMIC BRAKING OF MOTOR ASSOCIATED WITH BRAKE BOOSTER SUBSYSTEM

(71) Applicant: Autoliv ASP, Inc., Ogden, UT (US)

(72) Inventor: Curt M. Roberts, Howell, MI (US)

(73) Assignee: Veoneer US, Inc., Southfield, MI (US)

( * ) Notice: Subject to any disclaimer, the term of this patent is extended or adjusted under 35 U.S.C. 154(b) by 134 days.

(21) Appl. No.: 15/581,860

(22) Filed: Apr. 28, 2017

(65) Prior Publication Data

US 2018/0312149 A1  Nov. 1, 2018

(51) Int. Cl.
| | | |
|---|---|---|
| *B60T 13/20* | (2006.01) | |
| *B60T 13/66* | (2006.01) | |
| *B60T 13/74* | (2006.01) | |
| *B60T 17/22* | (2006.01) | |

(52) U.S. Cl.
CPC ............ *B60T 13/20* (2013.01); *B60T 13/662* (2013.01); *B60T 13/745* (2013.01); *B60T 17/22* (2013.01); *B60T 2270/402* (2013.01); *B60T 2270/414* (2013.01)

(58) Field of Classification Search
CPC ...... B60T 13/20; B60T 13/745; B60T 13/165; B60T 13/662; B60T 2270/402; B60T 2270/414
See application file for complete search history.

(56) References Cited

U.S. PATENT DOCUMENTS

| | | | | |
|---|---|---|---|---|
| 9,016,058 B2 * | 4/2015 | Hotani | ................. | B60T 13/745 60/534 |
| 9,061,673 B2 * | 6/2015 | Weiberle | ................ | B60T 7/042 |
| 9,199,623 B2 * | 12/2015 | Hyun | ...................... | B60T 8/885 |
| 9,321,444 B2 * | 4/2016 | Ganzel | .................. | B60T 13/168 |
| 9,340,191 B2 * | 5/2016 | Yang | ..................... | B60T 13/588 |
| 2005/0225168 A1 | 10/2005 | Nakamura et al. | | |
| 2009/0045672 A1 | 2/2009 | Nishino et al. | | |
| 2012/0090315 A1 | 4/2012 | Anderson et al. | | |
| 2014/0346852 A1 | 11/2014 | Thrasher | | |
| 2015/0028666 A1 | 1/2015 | Linhoff | | |

OTHER PUBLICATIONS

International Search Report for PCT/US2018/027749, ISA/US, dated Jul. 2, 2018.
Written Opinion of the ISA for PCT/US2018/027749, ISA/US, dated Jul. 2, 2018.

* cited by examiner

*Primary Examiner* — Xuan Lan Nguyen
(74) *Attorney, Agent, or Firm* — Stephen T. Olson; Harness, Dickey & Pierce, P.L.C.

(57) ABSTRACT

A method is disclosed for controlling operation of a motor-driven brake boost assist system of a vehicle braking system during a loss of battery power to the brake boost assist system. The method may involve detecting a condition during which a power loss event to the brake boost assist system has occurred, and a motor associated with the brake boost assist system is being driven by linear movement of a component within the brake boost assist system in response to fluid pressure developed within the brake boost assist system. The method further involves using a voltage generated by the motor during the power loss event to help initiate a dynamic braking action on the motor.

20 Claims, 6 Drawing Sheets

SYSTEM AND METHOD FOR DYNAMIC BRAKING OF MOTOR ASSOCIATED WITH BRAKE BOOSTER SUBSYSTEM

FIELD

The present disclosure relates to braking systems for motor vehicles, and particularly to a braking system which can detect, in real time, when a power loss condition has arisen and a brake booster subsystem has lost power, and can dynamically brake a motor of the brake booster subsystem to prevent damage to the brake booster subsystem.

BACKGROUND

The statements in this section merely provide background information related to the present disclosure and may not constitute prior art.

Modern day power assisted braking systems used on passenger automobiles (i.e., cars and trucks) typically make use of a brake booster to assist providing a pressurized fluid flow to the brake calipers of the vehicle when the operator depresses the brake pedal of the vehicle.

Typically the brake boost assist system includes a ball screw nut which is driven by an electric motor. In one embodiment, shown in FIG. 1, a driver applies a force on a brake pedal (not shown) which is transferred to a coupling element 1 along the direction of arrow A. A sensor within the brake boost assist system 2 (not visible in FIG. 1) detects movement of an input rod 3 caused by the pedal movement. An electronic control unit ("ECU") of the vehicle determines an appropriate control strategy. A motor (not visible) operably associated with the brake boost assist system 2 receives a signal from the ECU during a braking action, which signal is partly dependent on a sensed stroke of the brake pedal. The motor drives a belt 4 which drives a pulley 5, which in turn drives a ballscrew nut (not visible). The ballscrew nut drives a ballscrew 6 in an axial movement in accordance with arrow B. This causes movement of a piston located within a casing or housing of the brake boost assist system 2. The piston is driven in an axial motion toward a fully extended position, which changes the hydraulic pressure in a master cylinder of the vehicle. When the piston is driven axially toward its fully extended position, it provides a maximum pressurized fluid flow to the brake calipers of the vehicle to help in braking the vehicle.

Figure 1:
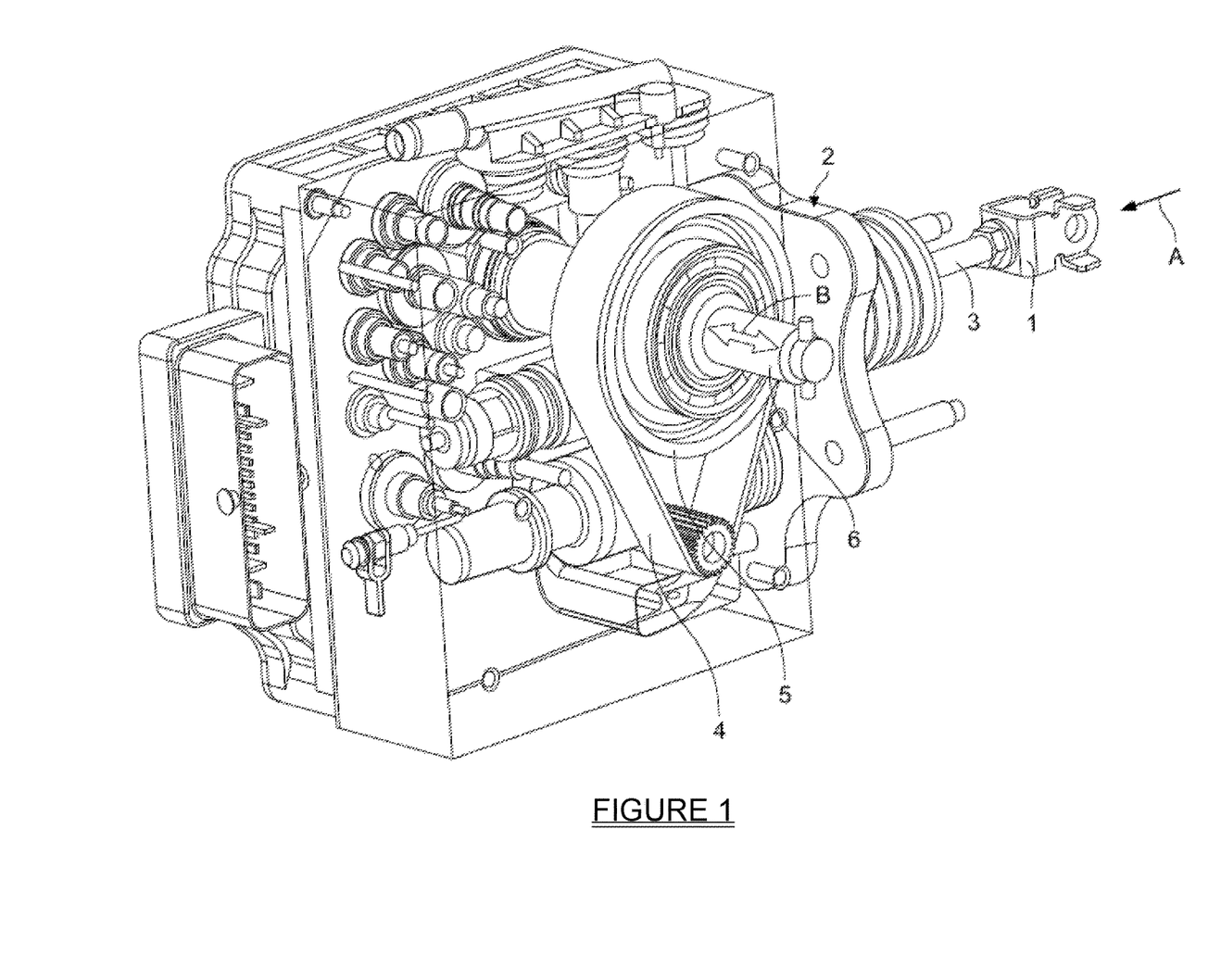
FIG. 1 is a simplified perspective drawing of a brake boost assist system which is not able to dynamically brake a motor associated with the system during operation of the system.

In the rare event that DC power to the ECU is suddenly lost, a condition may develop in which the hydraulic pressure developed within the housing of the brake boost assist system acts on the piston and drives it rapidly and abruptly back to its fully retracted (i.e. "home") position. During this retracting movement the electric motor is driven in the opposite rotational direction by the reverse rotational movement of the ballscrew 6. Since there is little resistance provided by the motor when it is driven rotationally in the reverse direction by the ballscrew, there is a possibility that the ballscrew may be driven with significant force by its associated components (e.g., motor, pulley, etc.) such that its sudden stop may result in significant force being exerted on an interior wall of the housing. This may give rise to a risk of fracturing the housing or otherwise damaging the ballscrew. Accordingly, it would be highly desirable to somehow detect, in real time, when a power loss condition has arisen and the brake boost assist system has lost power, and to provide some mechanism for dynamically braking the motor of the brake boost assist system to prevent damage to the system.

SUMMARY

The present disclosure relates to a method for controlling operation of a motor-driven brake boost assist system of a vehicle braking system during a loss of battery power to the brake boost assist system. The method may comprise detecting a condition during which a power loss event to the brake boost assist system has occurred and a motor associated with the brake boost assist system is being driven by fluid pressure developed within the brake boost assist system. The method may further involve using a voltage generated by the motor during the power loss event to help initiate a dynamic braking action on the motor.

In another aspect the present disclosure relates to a method for controlling operation of a motor-driven brake boost assist system of a vehicle braking system during a loss of battery power to the brake boost assist system, when a power loss event occurs in which an element within the brake boost assist system is driven back to a home position. The method may involve using rotation of the motor to generate an AC voltage, and using a bridge driver section associated with the motor to receive the AC voltage and to generate a DC voltage therefrom. The method may further involve coupling the DC voltage to a power supply section which controls the bridge driver section, and which provides power to an electronic control unit (ECU) which has powered down upon the power loss event occurring. The method may further involve using the power supply section to use the DC voltage to power back up the ECU, and using the ECU to control the bridge driver section to dynamically brake the motor.

In still another aspect the present disclosure involves a system for controlling operation of a motor-driven brake boost assist system of a vehicle braking system during a loss of battery power to the brake boost assist system. The system may comprise a brake boost assist system including a motor, a driver stage for generating drive signals used to help commutate the motor, and a bridge switching circuit in communication with the driver stage for commutating the motor in response to the drive signals from the driver stage. A circuit may be used which is in communication with the bridge switching circuit. The bridge switching circuit is used to generate a DC voltage in response to a loss of battery power event in which the motor is driven rotationally toward a home position by an element within the brake boost assist system. The circuit may be configured to use the DC voltage to control at least one electronic switching element to control the bridge switching circuit during the power loss event such that the bridge switching circuit acts as a load for the motor to dynamically brake the motor.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2A:
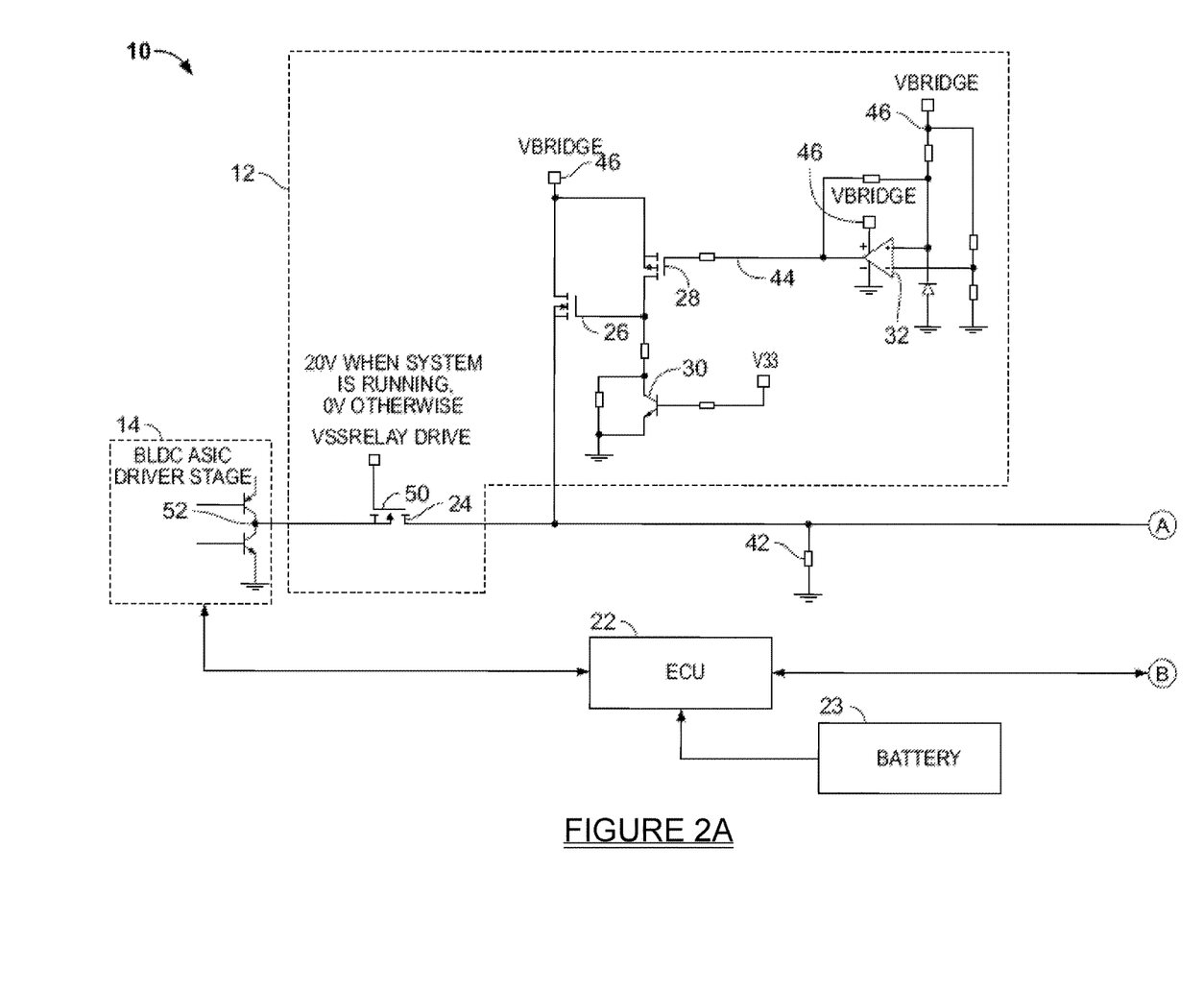
FIGS. 2A and 2B show a schematic representation of one embodiment of an electronic circuit in accordance with the present disclosure which is used to help dynamically brake the electric motor associated with the brake boost assist system shown in FIG. 1, and where the electronic circuit does not require operation of an electronic control unit (ECU) to accomplish the dynamic braking action on the motor.
Figure 2B:
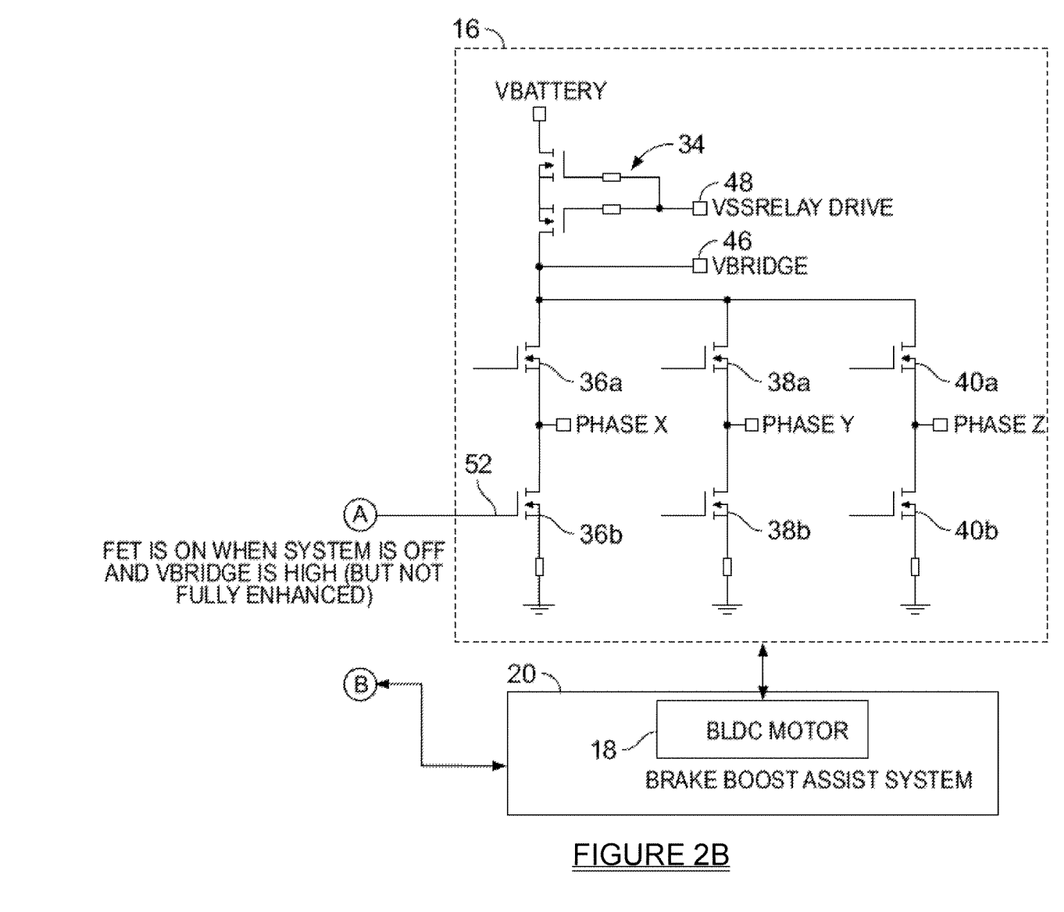

Referring to FIGS. 2A and 2B, one embodiment of a system 10 in accordance with the present disclosure is illustrated. The system 10 in this embodiment forms a circuit 12 that is interfaced between an existing brushless DC ("BLDC") motor ASIC driver stage 14 and an existing bridge switching circuit 16, which are both used to control operation of a BLDC motor 18 of a brake boost assist system 20. An important advantage of the system 10 is that it does not require any additional software to be run by an ECU 22, which is controlling operation of the BLDC motor 18, during normal operation when power is available to the ECU 22. As will be described more fully in the following paragraphs, the system 10 enables a loss of power from a battery 23 of a vehicle with which the system 10 is being used to be detected, and the bridge switching circuit 16 to be controlled, in real time, in a manner that provides a dynamic braking action on the BLDC motor 18 as it is driven rotationally by axial movement of a ballscrew of the brake boost assist system 20.

With further reference to FIGS. 2A and 2B, the circuit 12 includes a first FET 24, a second FET 26, a third FET 28, a bipolar junction transistor (BJT) 30, and a comparator circuit 32. The bridge switching circuit 16 is conventional in construction and includes a solid state relay 34, a fourth FET 36a, a fifth FET 36b, a sixth FET 38a, a seventh FET 38b, an eighth FET 40a and a ninth FET 40b. FETs 36a, 36b, 38a, 38b, 40a and 40b are switched on and off in a well-known manner to help control commutation of the BLDC motor. A resistor 42 is used to keep the FET 36b off when FET 24 is off. The BLDC ASIC has its own resistor inside of the ASIC that keeps FET 36b off when the ECU 22 is off—the resistor 42 provides the same functionality since the ASIC is isolated from the FET 36b when the ASIC is off.

The first FET 24 is used to disconnect the ASIC driver stage 14 from the bridge switching circuit 16. Second FET 26 applies a voltage to the fifth FET 36b of the bridge switching circuit 16, and BJT 30 disables the circuit 12 when the system 10 is powered on and running normally. Third FET 28 and the comparator circuit 32 operate as a voltage threshold control subsystem. It will be appreciated that FET resistance, and thus power dissipation, is only specified under certain gate to source conditions, for example usually above 5.0 volts or above 10.0 volts. To ensure that power dissipation is not excessive, it is preferable to ensure that the voltage is correct for turning the FET 28 on. The voltage control threshold provides that function, ensuring that the voltage is above 5.0 or above 10.0 volts before attempting to turn the FET 28 on. The fifth FET 36b can also be turned on by the circuit 12 to short the BLDC motor 18 phase windings as needed so that the bridge switching circuit 16 and the motor phase windings act as a load to the BLDC motor 18.

During normal operation with the battery 23 connected and supplying DC power (typically 12 vdc) to the system 10, first FET 24 will be turned on. This enables the BLDC ASIC driver stage 14 to provide a current to the bridge switching circuit 16. The bridge switching circuit 16 otherwise operates in its normal, conventional fashion to electronically commutate the BLDC motor 18. During this normal mode of operation, an output 44 of comparator circuit 32 is high, the second FET 26 is turned off, the third FET 28 is turned on, and the BJT 30 is turned on. Turning BJT 30 on effectively keeps the second FET 26 turned off.

When the system 10 loses DC power, regardless if the DC battery 23 remains physically connected to the system 10 or not, and when the BLDC motor 18 is spinning, such as it will be when the ballscrew/piston of the brake boost assist system 20 is being driven toward its home position by hydraulic pressure within the housing of the brake boost assist system 20, a voltage will still exist at point 46 (Vbridge). This is because the BLDC motor 18 will be acting as a generator and generating an AC voltage into the bridge switching circuit 16. During this power loss event, solid state relay 34 will be turned off and BJT 30 will also be turned off. The BJT 30 may be turned on by an operational voltage rail, for example an operational 3.3 voltage rail. It will be appreciated that if the 3.3V rail powering the microcontroller and other electronics on the ECU 22 is up and running—i.e. at 3.3 volts—then BJT 30 will be turned on and conducting, which will only allow the BLDC ASIC to control FET 36b. But when BJT 30 turns off, this causes second FET 26 to turn on. The loss of the VSS relay drive voltage output at point 48 from the solid state relay 34 causes a loss of voltage at gate 50 of the first FET 24. Turning off the first FET 24 disconnects an output 52 of the ASIC driver stage 14 from gate 54 of fifth FET 36b, and thus from the bridge switching circuit 16. Fifth FET 36b will be turned on and held on when Vbridge at point 46 is high.

During the above-described condition where power to the system 10 has been lost but the BLDC motor 18 is being driven rotationally by the ballscrew, the BLDC motor will be acting as a generator. When it is operating as a generator the BLDC motor 18 will be providing an AC signal back into the bridge switching circuit 16. The bridge switching circuit 16 will be acting as a full wave rectifier to provide a fully rectified DC voltage at point 46. This serves to provide DC power to the comparator circuit 32 and the second FET 26 to enable control of the bridge switching circuit 16 to be taken over during the above-described power loss event. Importantly, the bridge switching circuit 16 can be controlled to dissipate electrical power being delivered by the BLDC motor 18, and thus to dynamically brake the BLDC motor as it is being driven by the ballscrew moving toward its home position. The dynamic braking is therefore achieved with a very limited number of additional hardware components (i.e., represented by system 12), and without any action being required from the ECU 22, or any modifications to ECU software, or any modifications to the bridge switching circuit 16 itself.

Figure 3A:
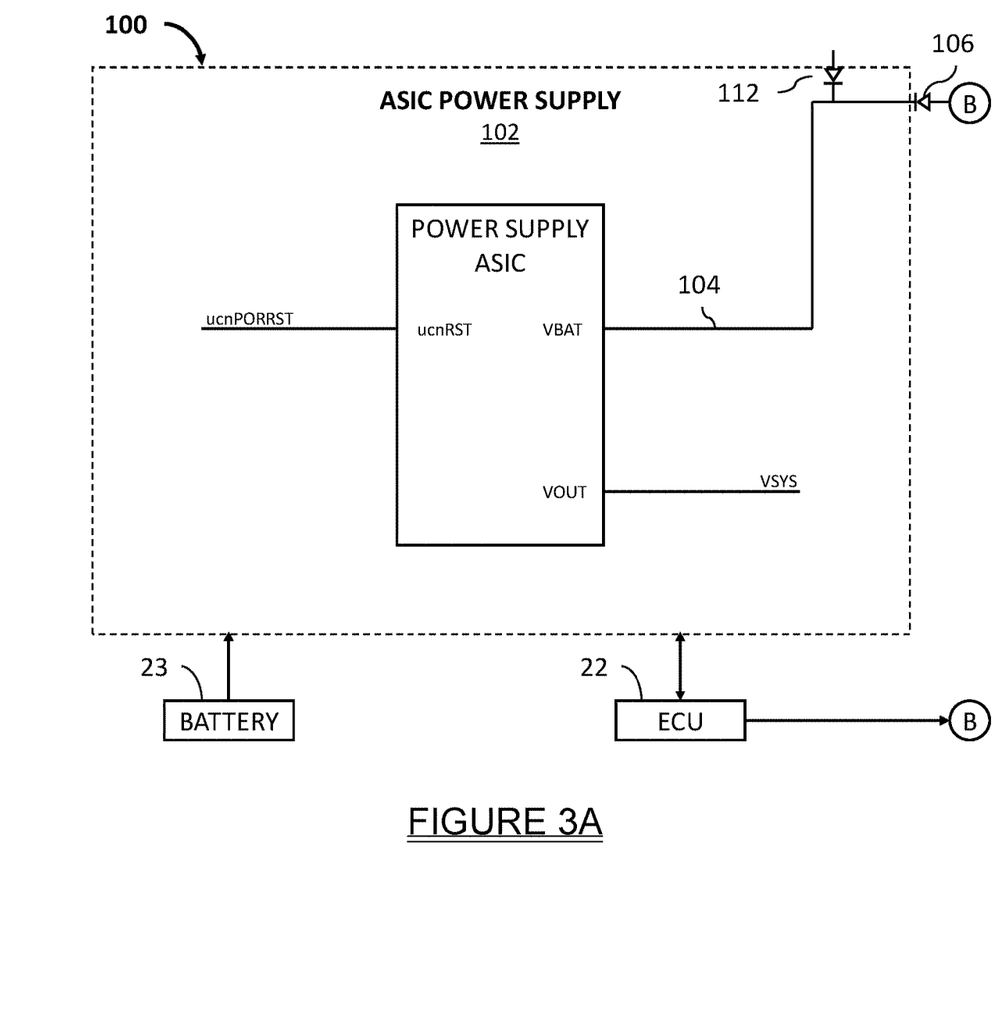
FIGS. 3A and 3B show a schematic representation of another embodiment of the present disclosure for providing dynamic braking of the motor of the boost assist system during a power loss event, but which operates to provide emergency power to the ECU obtained from a voltage generated by the motor of the brake boost assist system during the power loss event, so that the ECU can implement the dynamic braking control on the motor.
Figure 3B:
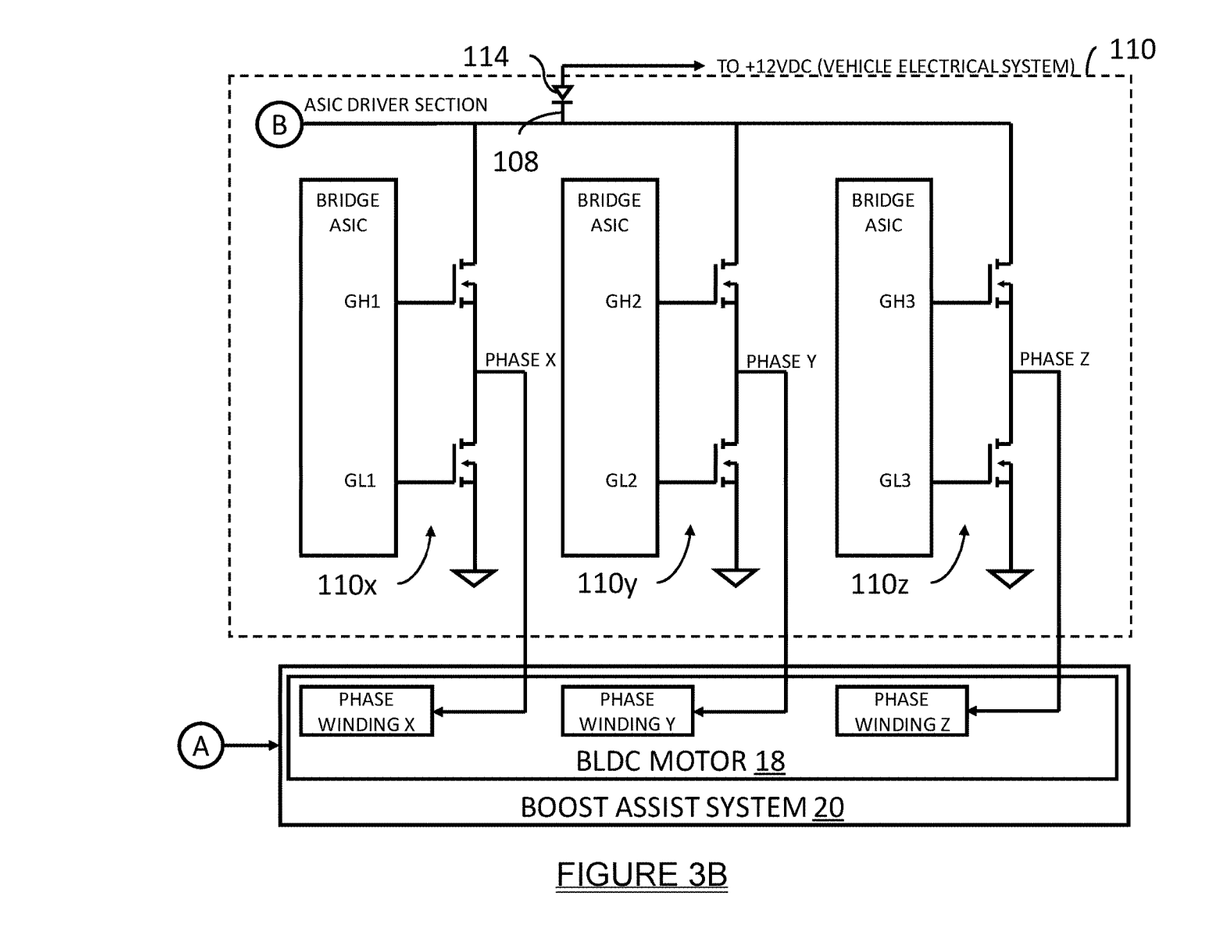

Referring to FIGS. 3A and 3B, a system 100 in accordance with another embodiment of the present disclosure is illustrated. The system 100 also operates to provide a dynamic braking action to the BLDC 18, but instead of using a network of additional electronic switches, make use of a single diode to feed a rectified DC signal provided by the bridge switching circuit 16 back into a power supply input of an ECU power supply 22a (e.g., possibly provided as a separate ASIC), which in turn powers the ECU 22. In this manner the ECU 22 can be maintained in a powered up condition even during a power loss event. This enables the ECU 22 to maintain control over the ASIC, and thus to maintain control over the bridge switching circuit 16 as needed to cause the bridge switching circuit to act as a load to dissipate the electrical power being generated by the BLDC motor 18 while it is being driven by movement of the ballscrew.

As shown in FIGS. 3A and 3B, the system 100 accomplishes powering the ECU 22 by providing a diode 106 coupled between an ASIC power supply section 102 input 104 and a common point 108 of an ASIC driver section 110. It will be appreciated that both the ECU 22 and the ASIC pre-driver section 102 may be powered by power provided by the ASIC power supply section 102. In one example implementation a single ASIC may have both the power supply section 102, which includes its own microcontroller, as well as the driver section 104. Alternatively, it is possible that these subsystems may be on separate ASICs.

The Common point 108 of the ASIC driver section 110 is tied to one side of all of the phase windings of the BLDC motor 18. The ASIC driver section 110 includes driver stages 110x, 110y and 110z which provide the drive currents to each of the X, Y and Z phase windings of the BLDC motor 18, as is well known in the art. Reverse battery protection diodes 112 and 114 connect to the vehicle's electrical system and prevent the generated DC voltage produced at common point 108, when the BLDC motor 18 is acting as a generator, from being coupled to other portions of the vehicle electrical system. The diode 114 may also be a solid state relay. If the diode 114 is implemented as a solid state device, then it provides the ability to disconnect the ASIC driver section 110 from the vehicle's battery as well.

When the ballscrew of the boost assist system 20 begins being driven toward its home position by hydraulic pressure after power is initially lost, the BLDC motor 18 begins operating as a generator and produces an AC voltage that is fed into the ASIC bridge driver section 110. The bridge driver section 110 then produces a DC voltage at common point 108. This is because the FETs within the ASIC driver section 110, which are not being turned on at this point because of the loss of power to the ASIC pre-driver section 102, have parasitic body diodes which enable the FETs of the driver section 110 to act as a full wave bridge rectifier circuit. The DC voltage at point 108 can then be used to forward bias diode 106 and apply the generated DC voltage signal to the ASIC power supply section 102. This allows the ASIC power supply section 102 to power back up and to generate the DC output signal, needed to power back up the ECU 22. Again, when the power loss condition initially occurs, the ECU 22 will immediately power down, but the time delay between when the DC signal at point 108 is produced and the ASIC power supply section 102 is powered back up, and then powers back up the ECU 22, is very short. Typically this time delay may be as little as about 1 ms-10 ms. So in practical terms, the ECU 22 will be powered back up virtually immediately after losing power, and can then command the ASIC power supply section 102 to begin controlling the driver section 110 as needed to dynamically brake the BLDG motor 18.

Figure 4:
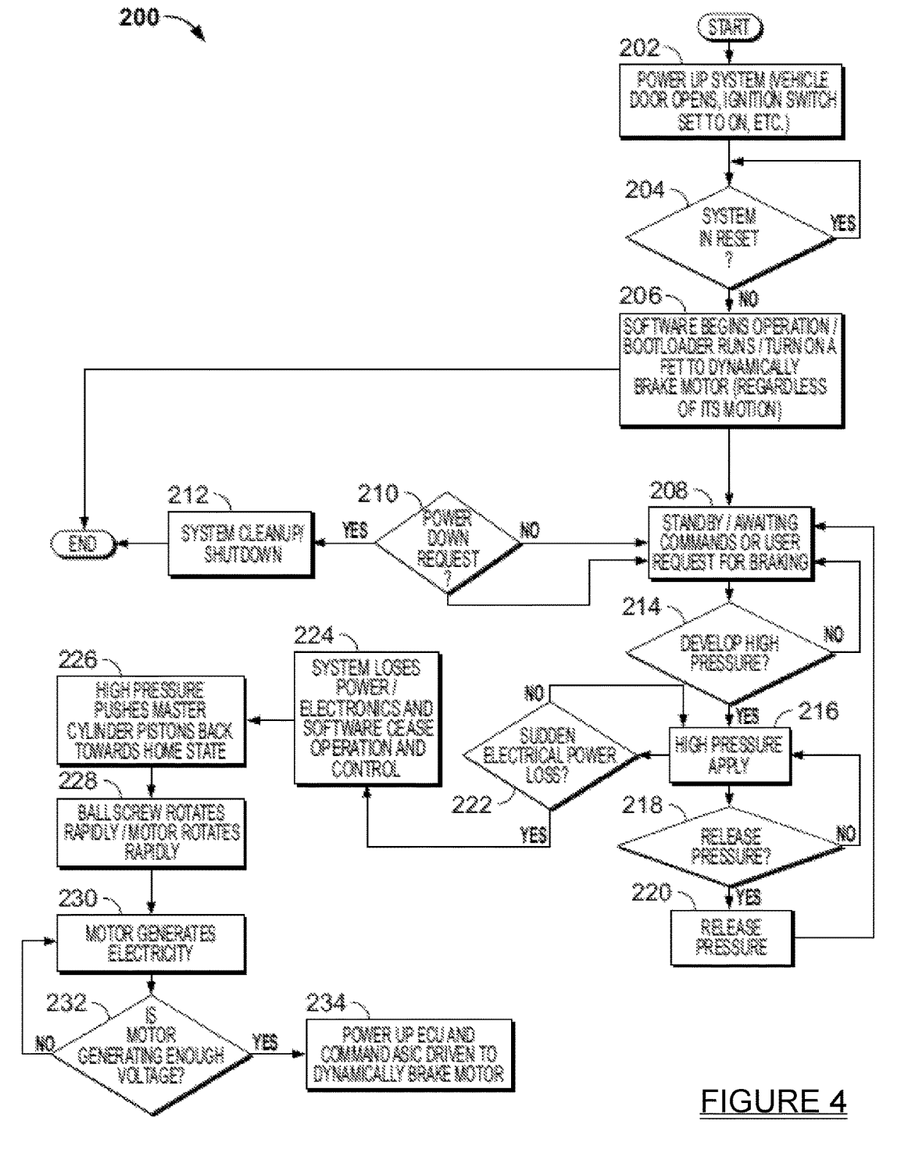
FIG. 4 is a flowchart of a series of operations performed by the electronic circuit of FIGS. 3A and 3B in monitoring for and detecting a power loss event, and powering back up the ECU during the power loss event.

With reference to FIG. 4, a flowchart for a software control module 200 is shown to illustrate how the software control module may use the components of system 100 to detect a power loss event and to control the ASIC driver section 110 to dynamically brake the BLDC motor 18. Initially at operation 202, the system 100 is powered up when some predetermined event occurs, for example a vehicle door is opened or an ignition switch of the vehicle is turned on. The system 100 will always execute a reset operation when powering up. A check is made at operation 204 to determine if the reset operation is complete. By "complete" it is meant that the power supply rails are in the correct voltage range, and have been stable for a predetermined amount of time (i.e., typically a few milliseconds). System 100 is in the midst of performing a reset operation. If the check at operation 204 is not complete, then the check at operation 204 is re-executed until the reset operation is complete. When the reset operation is detected as being complete, then at operation 206 a bootloader operation is started which causes the ASIC drive section 110 to be controlled to dynamically brake the BLDC motor 18 regardless of the direction of rotation of the motor.

At operation 208 the software module 200 enters a standby mode and waits for commands or a user request for braking by sensing a position of the vehicle's brake pedal. At operation 210 a check is made if a power down request has been received and, if not, operation 208 is repeated. If a power request is detected as having been received at operation 210, then the software module 200 performs a shutdown routine at operation 212. If the a command for high braking pressure is detected at operation 214, then at operation 216 the boost assist system 20 is used to generate a high pressure response to initiate a braking action at the vehicle's brake calipers. At operation 218 a check is made to detect if a "release Pressure" signal has been received by the brake boost assist system 20 and, if so, the pressure is released by the boost assist system as indicated at operation 220.

At operation 222 a check is made if the system 100 has experienced a power loss event while the high pressure response is being performed. If not, the high pressure response is continued at operation 216. But if a power loss event has been detected at operation 222, then the system 100 will lose power to the ASIC power supply section 102, which will cause a power loss at the ECU 22 as well. These conditions are indicated at block 224. In this event, the high pressure developed within the vehicle's master cylinder will cause the master cylinder pistons to be driven back towards the home position. The ballscrew and its attached piston within the boost assist system 20 will also be pushed back towards its home position, causing the BLDC motor 18 to begin rotating rapidly in the retracting direction of rotation, as indicated by block 228. The BLDC motor 18 will then begin generating an AC signal, as indicated at block 230, which is virtually immediately converted to a full wave rectified DC voltage by the ASIC driver section 110. A check is then made at operation 232 to determine if the BLDC motor 18 is generating at least a predetermined minimum voltage (at common point 108 in the ASIC driver section 110) which is sufficient to run the ECU 22. If not, operation 230 is repeated. But if a sufficient voltage is being generated, then at operation 234 the ECU 22 is powered back up and the ECU controls the ASIC driver section, via the ASIC power supply section 102, to dynamically brake the motor.

In one implementation of the software control module 200 described above, when the ECU 22 is powered back up at operation 234, the ECU boots up through its normal boot up routine. This normal boot up routine may therefore involve a fairly extensive sequence of checks and resets for a wide variety of electronic subsystems of the vehicle. In a modified implementation of the software control module 200, operation 234 instead involves performing a "quick boot" sequence. The quick boot sequence involves an abbreviated set of checks and resets to significantly shorten the boot up sequence and allows the ECU 22 to more quickly gain control over the ASIC bridge driver section 110. The quick boot sequence may also make use of various algorithms for controlling various vehicle subsystems in a limited operational condition to further save power. The quick boot sequence may even involve eliminating DC power to certain non-essential subsystems (e.g., sensors, solenoids, communications networks) of the ASIC while the power loss event is occurring.

The hardware based system 10 may likewise optionally include software programmed into the ECU 22 used therewith to shed certain loads if a power loss event is detected, and the system 10 detects that it is running on power being generated by the BLDC Motor 18. In this manner non-essential ECU subsystems may remain powered down to ensure that sufficient power is available to control the additional electronic switches of the system 10 during the power loss event.

The examples illustrate the various embodiments and are not intended to limit the present disclosure. Therefore, the description and claims should be interpreted liberally with only such limitation as is necessary in view of the pertinent prior art.

What is claimed is:

1. A method for controlling operation of a motor-driven brake boost assist system of a vehicle braking system during a loss of battery power to the brake boost assist system, the method comprising:
    detecting a condition during which a power loss event to the brake boost assist system has occurred and a motor associated with the brake boost assist system is being driven by fluid pressure developed within the brake boost assist system; and
    using a voltage generated by the motor during the power loss event to help initiate a dynamic braking action on the motor.

2. The method of claim 1, wherein the voltage generated by the motor during the power loss event is used to help power back up an electronic control unit (ECU) of the vehicle, to thus enable the ECU to command the dynamic braking action on the motor.

3. The method of claim 1, wherein the voltage generated by the motor during the power loss event is used to power a plurality of electronic switching components that assist in controlling the dynamic braking action on the motor.

4. The method of claim 3, wherein the electronic switching components control a bridge switching circuit so that the bridge switching circuit acts as a load to the motor, to thus implement the dynamic braking action.

5. The method of claim 4, further comprising using the bridge switching circuit to receive an AC voltage generated by the motor during the power loss event and to convert the AC voltage into a full wave rectified DC voltage.

6. The method of claim 2, wherein the voltage generated by the motor initially comprises an AC voltage, and wherein the AC voltage is applied to a bridge switching circuit operably associated with the motor, and wherein the bridge switching circuit generates a full wave rectified DC voltage in response to receiving the AC voltage.

7. The method of claim 2, further comprising using a diode to couple the voltage generated by the motor to an ECU power supply section.

8. The method of claim 7, wherein once the ECU is powered up after the power loss event has occurred, the ECU is used to command the power supply section to control a bridge driver section to initiate the dynamic braking action.

9. The method of claim 4, further comprising using a bridge driver system to receive the voltage generated by the motor and to generate a DC voltage therefrom, which is applied to a power supply section to enable the power supply section to generate a voltage for powering an electronic control unit (ECU) of the vehicle.

10. The method of claim 2, further comprising implementing a modified boot up procedure when the ECU is booted up after the power loss event.

11. The method of claim 1, wherein the dynamic braking of the motor operates to decelerate a ballscrew element within the brake boost assist system.

12. The method of claim 1, comprising:
    when the power loss event occurs in which an element within the brake boost assist system is driven back to a home position, thus causing rotation of the motor, using the motor to generate an AC voltage;
    using a bridge driver section associated with the motor to receive the AC voltage and to generate a DC voltage therefrom;
    coupling the DC voltage to a power supply section which controls the bridge driver section, and which provides power to an electronic control unit (ECU) which has powered down upon the power loss event occurring;
    using the power supply section to use the DC voltage to power back up the ECU; and
    using the ECU to control the bridge driver section to dynamically brake the motor.

13. The method of claim 12, wherein coupling the DC voltage to the power supply section comprises using a diode to couple the bridge driver section to a power input line of the power supply section.

14. The method of claim 13, further comprising using a modified boot up routine for the ECU when the ECU is powered up after a power loss condition.

15. The method of claim 12, wherein using the ECU to control the bridge driver section comprises using the ECU to generate commands to the power supply section, which in turn controls the bridge driver section to effect the dynamic braking action on the motor.

16. The method of claim 12, wherein the bridge driver section and the power supply section are both part of an application specific integrated circuit (ASIC).

17. A system for controlling operation of a motor-driven brake boost assist system of a vehicle braking system during a loss of battery power to the brake boost assist system, the system comprising:
    a brake boost assist system including a motor;
    a driver stage for generating drive signals used to help commutate the motor;
    a bridge switching circuit in communication with the driver stage for commutating the motor in response to the drive signals from the driver stage;

a circuit in communication with the bridge switching circuit; and wherein the bridge switching circuit is used to generate a DC voltage in response to a loss of battery power event in which the motor is driven rotationally toward a home position by an element within the brake boost assist system, the circuit configured to use the DC voltage to control at least one electronic switching element to control the bridge switching circuit during the power loss event, such that the bridge switching circuit acts as a load for the motor to dynamically brake the motor.

18. The system of claim 17, wherein the circuit comprises a first transistor which uncouples the driver stage from the bridge switching circuit when the power loss event occurs.

19. The system of claim 17, wherein the circuit further comprises a second transistor which is turned on when the power loss event occurs and which applies a signal to the bridge switching circuit to cause the bridge switching circuit to act as a load during the power loss event.

20. The system of claim 19, wherein the second transistor controls the bridge switching circuit to short specific ones of a plurality of phase windings of the motor during the power loss event.

\* \* \* \* \*